United States Patent [19]

Stove

[11] Patent Number: 5,563,602
[45] Date of Patent: Oct. 8, 1996

[54] RADAR SYSTEM

[75] Inventor: Andrew G. Stove, Reigate, England

[73] Assignee: U.S. Philips Corporation, New York, N.Y.

[21] Appl. No.: 377,576

[22] Filed: Jan. 24, 1995

[30] Foreign Application Priority Data

Jan. 25, 1994 [GB] United Kingdom .................. 9401361

[51] Int. Cl.$^6$ .............................. G01S 13/66; G01S 13/93
[52] U.S. Cl. .................................. 342/70; 342/94; 342/96
[58] Field of Search .................................. 342/70–72, 92, 342/94, 95, 96

[56] References Cited

U.S. PATENT DOCUMENTS

| | | | |
|---|---|---|---|
| H1122 | 12/1992 | Pavek | 342/95 |
| 4,347,516 | 8/1982 | Shrekenhamer | 343/700 MS |
| 4,509,049 | 4/1985 | Haendel et al. | 342/87 |
| 4,846,571 | 7/1989 | Jelalian et al. | 356/5 |
| 4,864,308 | 9/1989 | Raab et al. | 342/351 |
| 5,013,979 | 5/1991 | Birleson | 342/375 |
| 5,128,684 | 7/1992 | Brown | 342/189 |
| 5,181,037 | 1/1993 | Komatsu | 342/70 |
| 5,191,337 | 3/1993 | Brovko et al. | 342/200 |
| 5,270,720 | 12/1993 | Stove | 342/174 |
| 5,361,072 | 11/1994 | Barrick et al. | 342/133 |

OTHER PUBLICATIONS

Sklnik, "Introduction to Radar Systems", published by McGraw Hill, NY, pp. 298–301.

Primary Examiner—Michael J. Carone
Assistant Examiner—Christopher K. Montgomery
Attorney, Agent, or Firm—Robert J. Kraus

[57] ABSTRACT

In an FMCW radar system, the velocity of obstacles relative to the radar couples a Doppler frequency shift into the return signal which causes an error in the range measurement. It is known to use a radar signal having a frequency ramp that both increases and decreases to distinguish the range of an obstacle from its velocity but when multiple obstacles are present this is not practical. By using a measure of velocity from a succession of return signals, which of the radar output signals from the upsweep and downsweep of the radar signal that relate to a particular obstacle can be identified so that the range and velocity can be determined accurately. The FMCW radar system may be provided with a frequency scanned antenna, the beamwidth determined by the processing circuitry is variable according to the size of the obstacle being detected or the range at which the radar is searching for obstacles. Instead of scanning the beam of the radar, the variation in frequency can be made to alter the beamwidth of the radar so that, for example, a car radar will detect only vehicles in the lane ahead of the car, regardless of the range of the vehicles.

9 Claims, 6 Drawing Sheets

RADAR SYSTEM

BACKGROUND OF THE INVENTION

The present invention relates to a radar system, for example a frequency modulated continuous wave radar system having particular, but not exclusive application to collision avoidance and intelligent cruise control arrangements in motor vehicles.

Frequency Modulated Continuous Wave (FMCW) radar systems have been known for some time to provide reasonably good range measurements at low cost and low transmitted energy levels. However, as known at present, they are not sufficiently reliable in low cost form to be used in serious applications, such as collision avoidance in an automotive environment.

SUMMARY OF THE INVENTION

It is an object of the present invention to provide improvements in the performance of FMCW radar systems.

A frequency modulated continuous wave radar system comprising an oscillator having a radar output signal arranged to provide ascending and descending frequency ramps, means for transmitting the radar output signal, means for receiving a reflected radar signal from obstacles and processing means responsive to the radar output signal and the reflected radar signal, characterised in that the processing means comprises means for deriving a first pseudorange for each obstacle reflecting a signal during the ascending frequency ramps, means for deriving a second pseudorange for each obstacle reflecting a signal during the descending frequency ramps, means for determining a first velocity estimate for each obstacle from a plurality of first pseudoranges, means for determining a second velocity estimate for each obstacle from a plurality of second pseudoranges, means for deriving a first range estimate for each obstacle in response to a first pseudorange and the first velocity estimate, means for deriving a second range estimate for each obstacle in response to a second pseudorange and the second velocity estimate for each obstacle, means for determining which first range estimate and which second range estimate correspond to the same obstacle.

By providing a further velocity measurement based on a plurality of obstacle ranges for the up and down frequency sweeps, the range and velocity of obstacles can be decoupled. If velocity information is also required this can be derived using the "raw" pseudorange data from a single upsweep and a single downsweep. Since it is known which return signal in each of the up and the down sweeps relates to each obstacle, the relevant return signals can be used to give a highly accurate velocity measurement.

In automotive environments particularly, it may be desired to provide azimuthal information on obstacles. This can be achieved at reasonable cost, vital for the automotive environment, by use of a frequency scanned antenna array. Such arrays have a serpentine between adjacent elements of the antenna array and this allows the frequency of the signal fed to the antenna to provide a beam scanning effect. When the wavelength of the signal fed into the serpentine feed of the antenna is an exact sub-multiple of the length of the feed between adjacent antenna elements, a beam is radiated straight ahead of the antenna. By reducing or increasing the frequency the antenna can be made to scan off-centre.

The processing applied to the output of such a radar antenna may be arranged favourably to process the return signal over a greater azimuthal range close to the radar, and over a narrower azimuthal range distant from the radar.

A further refinement of the frequency scanned antenna array is to provide a pair of arrays opposed to one another and fed from a point between them. In this arrangement the frequency scanning provides alternation of the width of the radar beam. This is particularly advantageous in collision-avoidance radar systems since it avoids the radar reacting to close obstacles which are not in the vehicle's path.

BRIEF DESCRIPTION OF THE DRAWINGS

The present invention will now be described with reference to the accompanying drawing, wherein.

DESCRIPTION OF THE PREFERRED EMBODIMENTS

Figure 1:
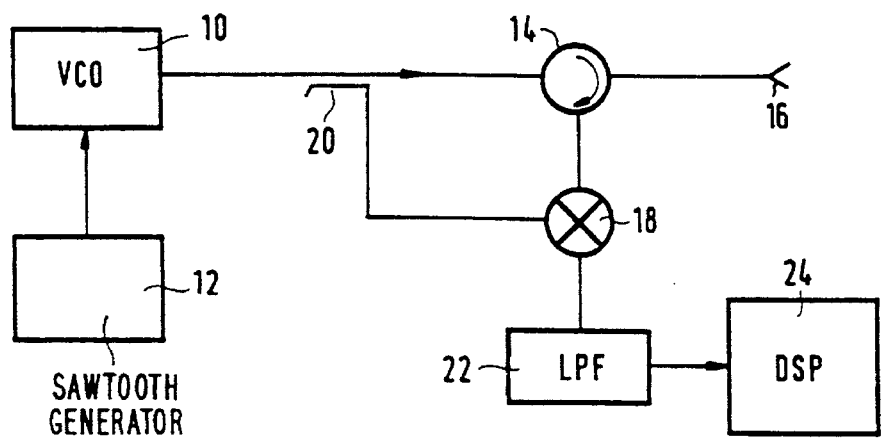
FIG. 1 shows a block schematic diagram of a FMCW radar system.

FIG. 1 shows a block diagram of a basic FMCW radar system, in which a Voltage Controlled Oscillator (VCO) 10 is modulated by the output of a sawtooth generator 12 and the output of the VCO is fed to an input to a circulator 14. A first output of the circulator 14 provides the VCO output substantially unattenuated to an antenna 16 which radiates the frequency modulated signal. The radiated signal may be reflected back to the antenna 16 by one or more obstacles (not shown) and the reflected signal passes from the antenna to the circulator 14 which supplies the reflected signal from a second circulator output to a first input of a mixer 18. A second input of the mixer 18 is fed from the output of the VCO 10 via a coupler 20. The output of the mixer 18 is fed to a low pass filter 22 to produce an intermediate frequency (IF) signal to a signal processing apparatus 24 for performing analysis of the IF signal. The apparatus 24 will generally perform a Fourier transform on the IF signal since the range of any obstacles in the radar's field of view is contained as frequency information in the IF signal.

Figure 2:
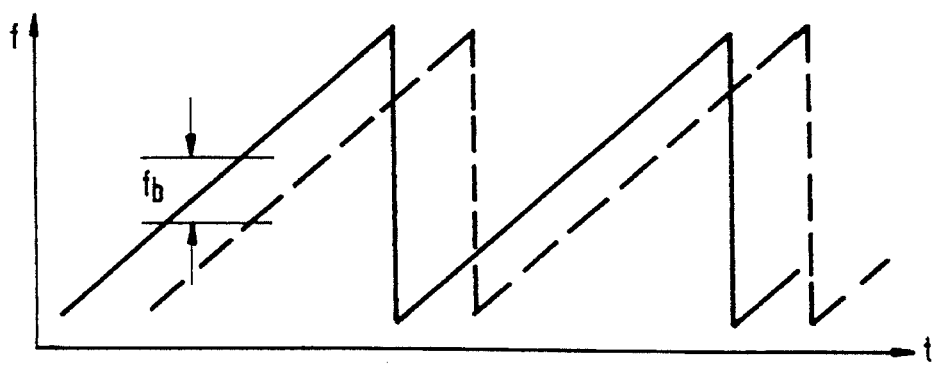
FIG. 2 shows a graph of frequency against time for the oscillator of a FMCW radar.

In operation of the radar system, the signals reflected back to the radar by the obstacles are delayed in time with respect to those from the VCO 10 as shown on a graph of frequency (f) against time (t) in FIG. 2. The frequency of the VCO signal is shown as a solid line and the frequency of the signal reflected by the obstacle is shown as a broken line. As would be expected the reflected signal has a frequency that lags behind that of the VCO signal in time. This gives rise to a beat frequency $f_b$ as shown by the pair of vertical arrows on the graph. This frequency difference is directly proportional (ignoring non-linearities in the circuitry) to the distance of the obstacle from the radar system. The distance or range r of the obstacle can be calculated from:

$$f_b = 2ar/c$$

where c is the speed of light and a is the rate of change of transmitter frequency with time.

A known drawback of FMCW radar arrangements is that of range—Doppler coupling which, briefly, is a result of the following effect. Where an obstacle is moving relative to the radar (whether the obstacle is moving, the radar is moving or both are moving) the signal reflected by that obstacle to the radar will include a Doppler frequency component. The Doppler effect is well known and will cause the frequency of the reflected signal to increase if the obstacle and the radar are moving closer together and to decrease if they are moving further apart. In a FMCW radar, since range information is derived from the frequency of the return signal (relative to the transmitted signal), this Doppler coupling covers inaccuracies in the range measurements. The severity of these inaccuracies is determined by the slope of the frequency ramp of the radar and the relative velocity of the obstacle.

Figure 3:
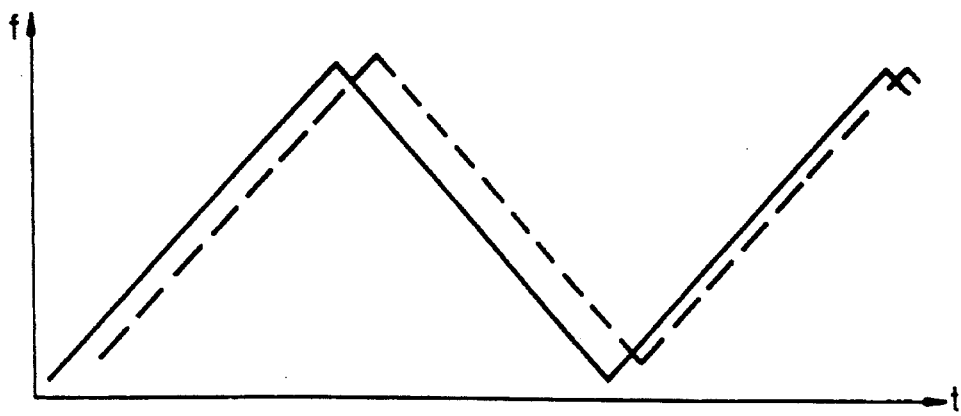
FIG. 3 shows another graph of frequency against time for the oscillator of a FMCW radar.

A solution that has been proposed to the problem of range-Doppler coupling is to use both ascending and descending frequency ramps in the transmitted radar signal. Such a frequency envelope is illustrated in FIG. 3. The transmitted signal is shown as a solid line and the return signal (from a single obstacle moving relative to the radar) is shown as a broken line. This technique allows the radar to distinguish between a frequency shift caused by the range of an obstacle and a frequency shift caused by the velocity of the obstacle as follows. During the frequency upsweep the range of the obstacle causes a return signal having a lower frequency than the instantaneous transmitted signal. During the frequency downsweep the range of the obstacle causes a return signal having a higher frequency then the (instantaneous) transmitted signal. The velocity of the obstacle causes an increase (moving towards the radar) in frequency or a decrease (moving away) in frequency independent of the direction of the frequency sweep. In FIG. 3 the beat frequency is greater on the downsweep than it is on the upsweep which indicates that the obstacle is moving towards the radar (increasing the frequency of the return signal). Mid-way between the beat frequencies is the 'real' beat frequency which can be used to give the correct range of the obstacle. The difference in the total intermediate frequency between these two cases is thus equal to twice the Doppler frequency due to the radial velocity of the obstacle. (See later for high velocity obstacles).

Unfortunately, in real situations where there is more than one obstacle, it can be difficult or even impossible to determine which of the return signals from the upsweep of the radar signal is associated with each of the return signals from the downsweep of the signal. This technique is consequently seldom used in practical FMCW radar systems.

Figure 4:
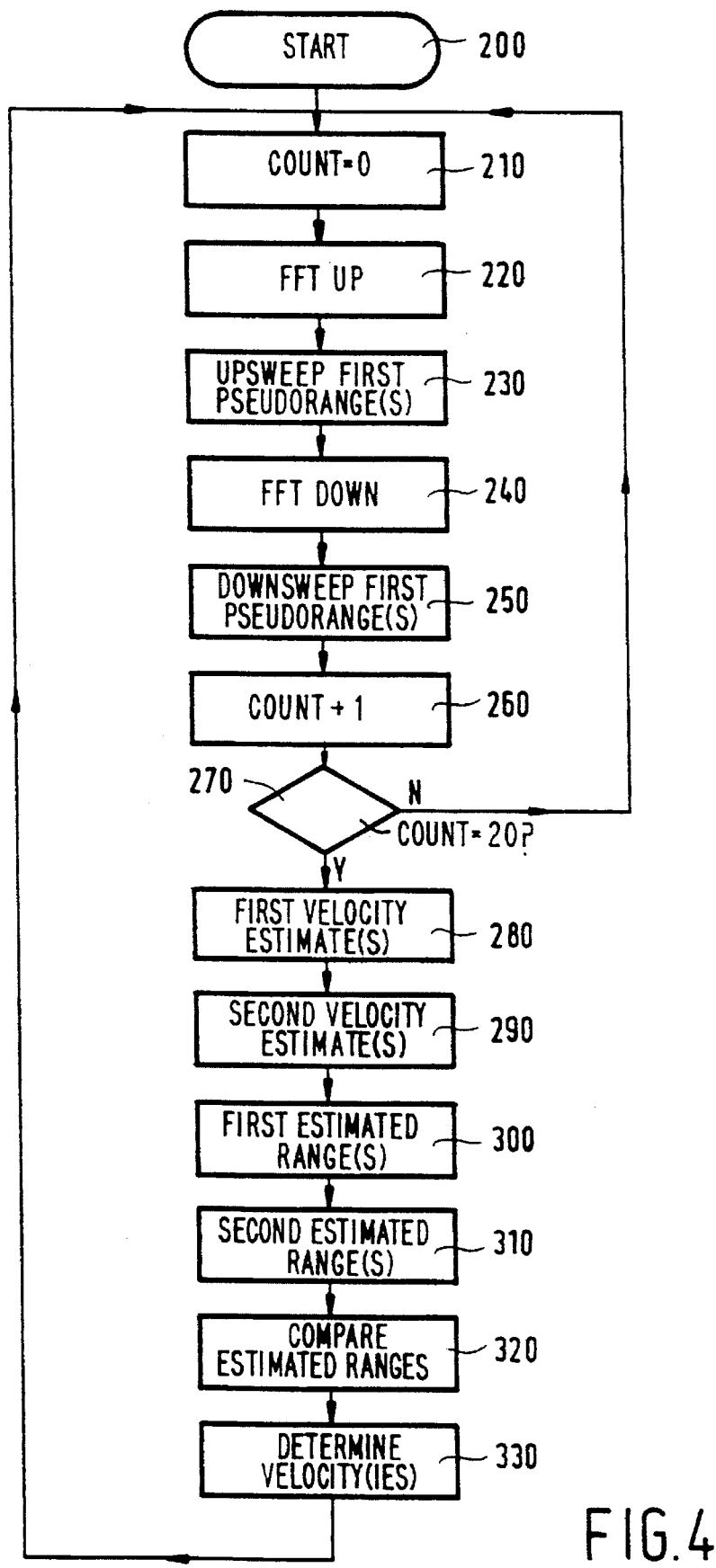
FIG. 4 shows a flow chart of the steps performed by a radar signal processing arrangement in accordance with the present invention.

FIG. 4 shows a flow chart which describes a series of operations which the radar signal processor shown in FIG. 1 executes to provide a radar system in accordance with the invention. The sawtooth generator 12 shown in that Figure is arranged to provide a waveform from the VCO that sweeps both up and down in frequency. The boxes represent the following series of operations:

| | |
|---|---|
| 200- | Start |
| 210- | set loop counter to zero |
| 220- | perform FFT on a portion of the IF signal to derive the beat frequencies resulting from a single upsweep of the radar oscillator |
| 230- | calculate and store a first pseudorange for each of the upsweep beat frequencies |
| 240- | perform FFT on a portion of the IF signal to derive the beat frequencies resulting from a single downsweep of the radar oscillator |
| 250- | calculate and store a first pseudorange for each of the downsweep beat frequencies |
| 260- | increment loop counter by 1 |
| 270- | is loop counter equal to 20? |
| 280- | derive a first velocity estimate for each obstacle from the twenty stored first pseudoranges |
| 290- | derive a second velocity estimate for each obstacle from the twenty stored second pseudoranges |
| 300- | use the first velocity estimate for each obstacle to predict the Doppler shift due to velocity and subtract the effect of the Doppler shift from each first pseudorange and give a first estimated range |
| 310- | use the second velocity estimate for each obstacle to predict the Doppler shift due to velocity and subtract the effect of the Doppler shift from each second pseudorange and give a second estimated range |
| 320- | derive the distance between all possible pairs of first and second estimated range to determine which ones of each are due to the same obstacle |
| 330- | (now that the respective beat frequencies in the IF signals for the upsweep and the downsweep can be identified,) use the original beat frequency information to derive the velocity of each obstruction from the principle that the beat frequency due to the range of the obstacle is cancelled when the beat frequencies from the upsweep and the downsweep of the radar signal are added together |

Thus, the arrangement performs a number of Fourier transforms on IF signals which have resulted from only the upsweep or the downsweep of the radar signal and the beat frequencies measured, which contain both range and velocity information, are called pseudoranges. The arrangement makes first and second velocity estimates based on a number of successive beat frequencies from the upsweep and the downsweep respectively. These estimates of velocity induced range shifts are then subtracted from the pseudoranges to provide a first order correction for the values of range. As we now know the actual ranges of the obstacles we know where they are in space. We then assume that only one obstacle can occupy any point in space, and hence there will only be one object at any given range. Hence we find that for each obstacle there will be one radar output in each sweep direction with the appropriate range. The physical size of the obstacles and the range resolution ensures that there is no ambiguity. Once the pseudoranges from the upsweeps and the downsweeps that result from the same obstacle can be identified, an accurate assessment of the radial velocity of the obstacles can be derived using the traditional technique.

This technique relies upon the velocity of obstacles relative to the radar remaining reasonably constant but in automotive applications this does not cause a problem. Those obstacles that have a high velocity relative to the radar (for example cars in the other carriageway) are discounted on the basis of their position.

In some applications of this aspect of the present invention, however, obstacles having a high velocity relative to the radar are encountered and this can cause a problem as follows. In the radar system shown in FIG. 1 the polarity, or sense of the beat frequency is not known by the receiver because it has only one channel. Accordingly, the frequency shifts due to the range of an obstacle and the velocity of an obstacle combine by addition or subtraction and the output of the receiver is the modulus of the combined frequency shift. Thus, where the two frequently shifts subtract, what is available at the output of the receiver is the difference between them with no indication of whether this represents the range frequency shift minus the Doppler frequency shift or vice versa. In an automotive radar, as stated above, this causes no difficulties as the range frequency shift will always be greater than the Doppler frequency shift. However, when the obstacles are close to the radar and travelling with a high relative velocity, the reverse is the case. On the upsweep of the radar signal detecting a close, fast approaching obstacle, the total frequency shift will comprise the modulus of the Doppler frequency shift minus the range frequency shift. The result of the subtraction of the upsweep and downsweep beat frequencies will then result in a frequency proportional to the range of the obstacle and not the velocity of the obstacle.

Whether this confusion of the range and Doppler frequency shifts has occurred can readily be determined by the radar signal processing because the velocity value derived from the succession of pseudoranges will not accord with that derived from what is believed to be the Doppler shift. The remedy is very simple since the difference between the upsweep and the downsweep beat frequencies now represents the range of the obstacle and not the velocity of the obstacle. The first and second estimated ranges calculated at steps 300 and 310 in FIG. 4 will appear to be negative, in other words the predicted Doppler shift will exceed the total frequency shift measured at the receiver. Then at step 330, the difference signal between the beat frequencies obtained for the upsweep and the downsweep will be representative of the range of the obstacle rather than the velocity. Once the range is known accurately, the velocity can be derived in known manner from either or both the upsweep and downsweep beat frequencies.

For automotive applications of FMCW radar it is often required to derive some azimuthal information from the radar. This is in order that, for example, objects at the side of the road or in different lanes of a motorway from the vehicle carrying the radar may be disregarded. Radar systems of this kind are known and may be used to advantage in conjunction with the present invention.

Figure 5:
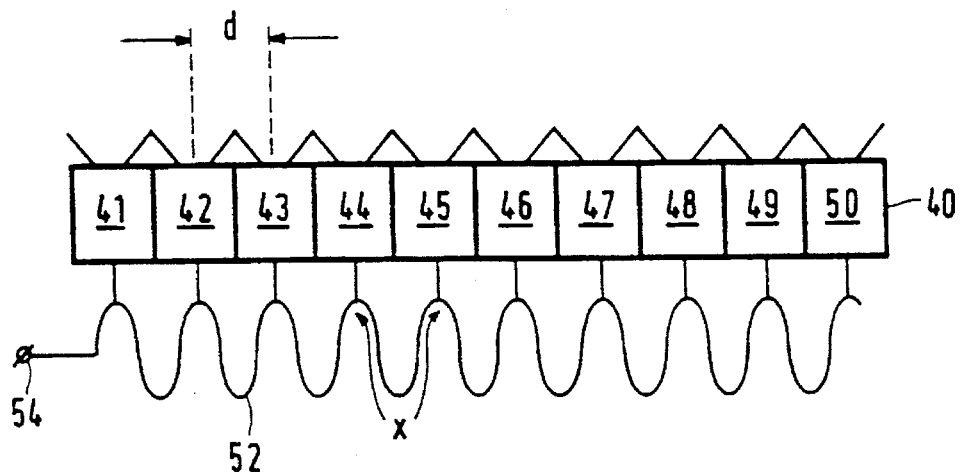
FIG. 5 shows a schematic diagram of an antenna array having a serpentine feed for use in a frequency scanned radar.

FIG. 5 shows a schematic diagram of an antenna array 40 comprising ten horn antenna elements 41 to 50 arranged side by side which are fed by a serpentine feed 52 having a single input 54. The signal from a radar oscillator is applied to the input 54 to pass along the feed 52 and a proportion of the signal is coupled to each of the antenna elements 41 to 50. In this known antenna arrangement the length x of the serpentine feed between each successive coupling to the antenna elements is arranged to be an integer number of wavelengths of the oscillator signal at a certain frequency. When the antenna array is fed with a signal at this frequency, all of the antenna elements are fed in phase with each other and this results in a beam transmitted by the antenna which propagates into space perpendicular to the antenna. If the frequency with which the antenna is fed is reduced slightly, in other words if the wavelength is increased, then the beam will be scanned to the left of the antenna, in other words towards the end at which the input is located. If the frequency is increased the beam will be scanned to the right of the antenna. The physical separation of the radiating centres of the antenna elements is shown as d. The ratio of the length x of the serpentine feed between adjacent elements to the physical separation of the elements is known as the 'wrap up factor' x/d. The larger the wrap up factor, the greater the angular beam scan obtained for a given frequency variation at the input to the antenna array. This is important because the angular beam scan is usually obtained as a result of the frequency modulation applied to the radar for range resolution purposes and is often constrained by practical or regulatory factors. The wrap up factor is typically of the order of 15. While the antenna illustrated has only ten radiating elements, a more typical value would be twenty to thirty elements to obtain a sufficiently narrow beamwidth for automotive radar applications. Further detail on the operation of frequency scanned antenna arrays can be found at pages 298 to 301 of "Introduction to Radar Systems" by Merrill I. Skolnik published by McGraw Hill, New York 1980.

Figure 6:
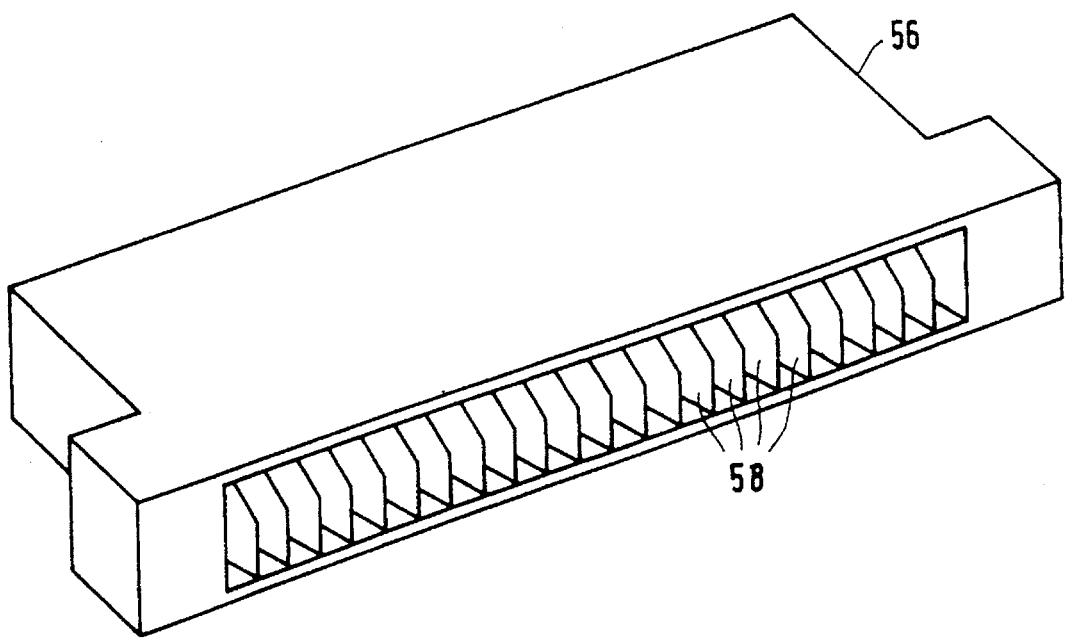
FIG. 6 shows a practical realisation of an antenna array having a serpentine feed.

FIG. 6 shows a practical embodiment of an antenna array for use with a frequency scanned radar. The antenna array 56 comprises twenty four small horn radiating elements of which the apertures 58 are visible in the drawing. The length of the antenna array in the direction of the radiating elements is 160 mm and the array has to be deep enough to house the serpentine feed. The array is a purely passive, waveguide structure which is particularly applicable to mass production, for example using injection moulding techniques. The array provides scanned beam coverage of approximately 12 degrees with a tuning rate of 83 MHz per degree when operated at between 93 and 94 GHz. The wrap up factor in this antenna is approximately 17.

For automotive obstacle detection and other applications of FMCW radar, it is desirable for the radar to scan in an azimuthal plane to permit the processing means coupled to the radar to build up a picture of the obstacles in front of the radar. Thus a measurement of the angles subtended by obstacles to the axis of the vehicle as well as the distance of the obstacles from the vehicle is obtained. A scanned antenna having 8 beams and a total coverage of approximately 12 degrees is considered here. Each beam is thus approximately 1.5 degrees wide which angular resolution is required to correspond approximately to the width of a road carriageway at 150 m which is the maximum required range of the radar system under consideration.

A difficulty that arises with a frequency scanned beam radar system is one of range resolution which has been found to be lower than desired at low range, in other words when the obstacles are quite close to the radar. The reason for this is that the resolution of FMCW radar is directly dependent upon the size of the frequency sweep of the transmitter. When only a portion of the total beam scan is considered, the range resolution deteriorates accordingly, in this case by a factor of eight times. This limits the usefulness of a FMCW frequency scanned beam radar system.

An improvement may be obtained as a result of the fact that, for an automotive radar at least, close obstacles subtend a larger angle at the radar system, in other words they appear in two or more adjacent beams. Thus a larger portion of return radar signal may be made available to the processing circuitry of the system and this can be used to obtain improved range resolution as discussed further below.

Figure 7:
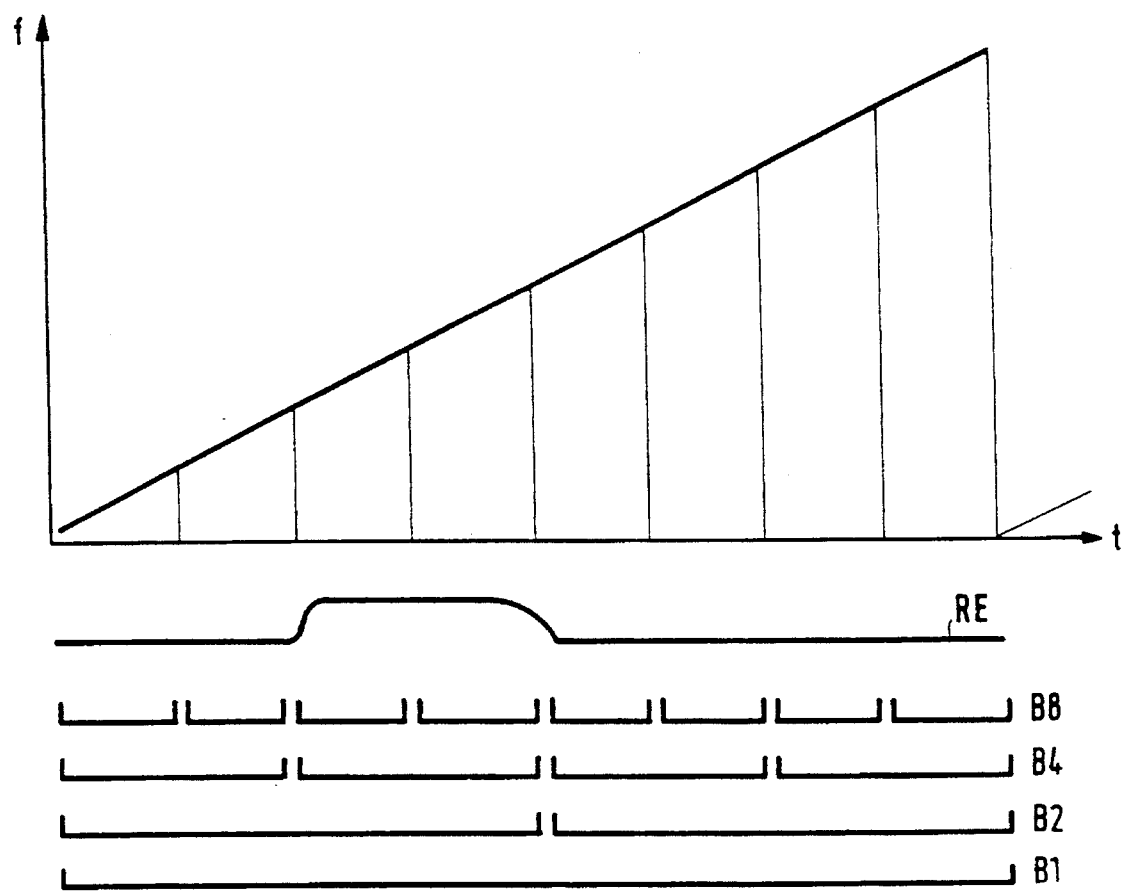
FIG. 7 shows a graph of frequency against time for part of an oscillator signal of a radar in accordance with the invention.

FIG. 7 shows a graph of transmitted frequency against time for the ascending frequency ramp of the radar signal and this graph has a sawtooth characteristic. Each sweep of the oscillator frequency is typically 1 GHz in size which is determined by regulatory authority rules, transmitter cost and so on. The time axis is shown divided into eight vertical segments which represent the beams of the radar. It is, of course, the signal processing that determines the beam sizes because a continuous signal is propagated by the antenna array during each frequency scan. Beneath the time axis there is a curve RE showing the envelope of an IF signal provided by the radar which signal falls substantially within the third and fourth time segments. This corresponds to an obstacle which reflects the third and fourth beams generated by the radar. The distance of the obstacle is determined from the frequency of the IF signal as is known for FMCW radar systems. In known frequency scanned radar systems the signal processing applied to the IF signal determines the range of the radar from obstacles for each beam as represented by the line of time segments marked B8 in FIG. 7.

Because, as noted above, at shorter ranges the range resolution obtained in an automotive radar has been found to be lower than desired, this embodiment of the present invention is arranged to process a greater portion of the beat signal for detecting obstacles at close range. This takes advantage of the fact that, in automotive radar, the majority of obstacles that are at such close ranges do appear in two or more adjacent beamwidths. For example a car 50 m away will subtend an angle of approximately 2 degrees at the radar whereas a car 20 m away will subtend an angle of approximately 5 degrees. Consequently obstacle range resolution is achieved in each domain where it is needed.

The radar in accordance with this embodiment of the invention may be arranged to operate on a range by range basis, in other words substantially the full length of each portion of a IF signal resulting from an obstacle is used to determine the range of the obstacle. Such an approach may be too computationally complex for a mass-produced radar, however, and an alternative is now described which is particularly suitable for signal processing including a fast Fourier transform (FFT).

Each beam of the radar is processed individually as depicted by the line B8 in FIG. 7 but the processing means is also arranged to process portions of the IF signal corresponding to adjacent pairs of beams as depicted by the line B4. This only provides improved range resolution for those obstacles which are close enough or large enough to occupy more than one beamwidth. Since it is generally desired to exclude return signals from vehicles in other carriageways, buildings and so on, there is no benefit and even some potential harm in using radar outputs at larger ranges with these broader beamwidths. The processing means can be further arranged to provide an output from two wide beams with consequently better range resolution for even closer obstacles (as indicated by line B2), and from one beam (as indicated by line B1) for very close obstacles such as might be encountered in heavy traffic or while manoeuvring. Where the number of beams is not an integer power of 2 a Discrete Fourier transform may be more efficient than a FFT.

Figure 8:
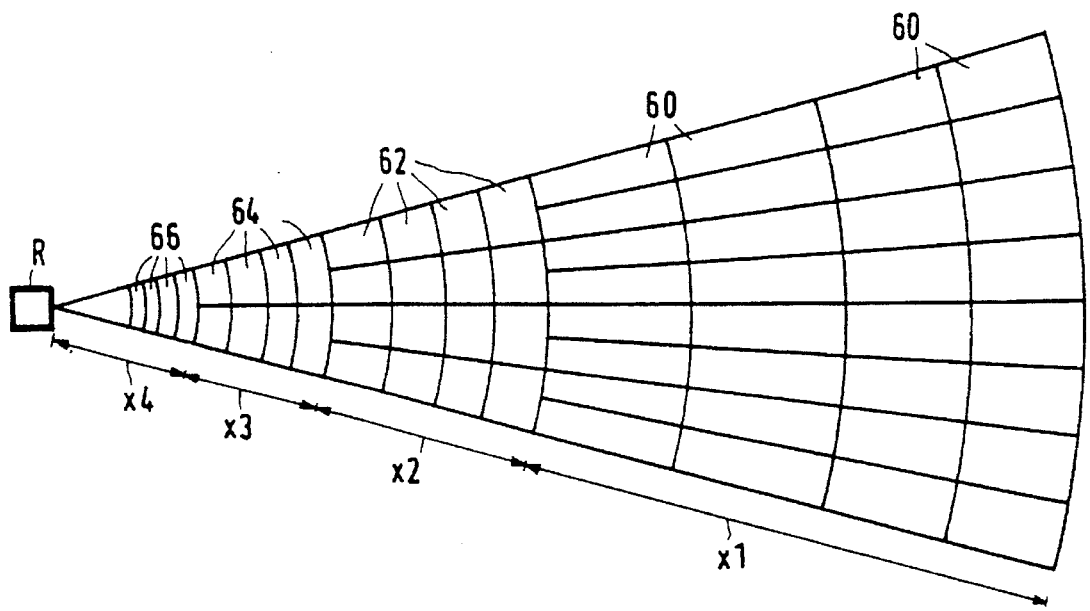
FIG. 8 shows a diagrammatic plan view of the radar beam produced by the radar.

FIG. 8 shows a diagrammatic radar beam pattern to illustrate the range resolution improvement provided by this aspect of the invention at low range. A range R transmits a scanned beam covering a sector of a circle, in this example a 12 degree sector of a circle (whose size is exaggerated for clarity in the drawing). At longer ranges in domain x1, all eight beams are processed as in a conventional frequency scanned radar but the range resolution is relatively poor as depicted by the length of range cells 60. At slightly closer ranges in domain x2, four beams are shown but the length of the range cell 62 is half of the length of the range cell 60. At closer ranges still (x3), only two beams are shown but the length of the range cell 64 is halved with respect to the range cell 62. At very close range (x4) only a single beam is shown and the length of the range cell 66 is half that of the range cell 64. While the drawings show broader beamwidths at closer ranges, there is nothing to prevent a return signal being received from a more distant obstacle while processing a broader beamwidth. However it will be clear from the value of the range that these relate to more distant obstacles and can be ignored by a later stage of the radar processing.

Figure 9A:
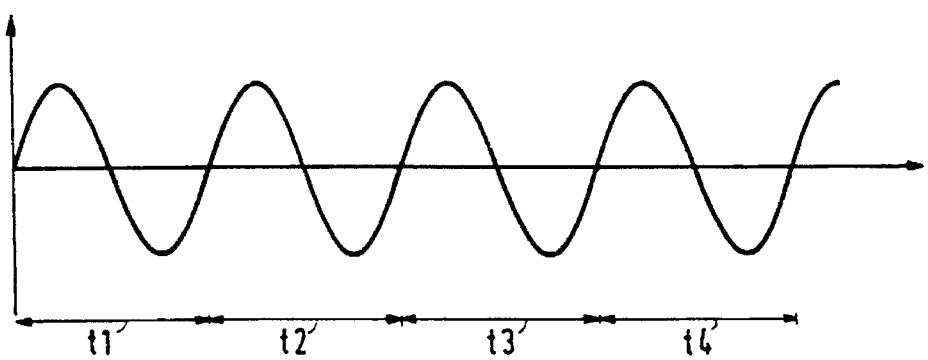
FIG. 9 shows a pair of waveforms used to describe improved range resolution.
Figure 9B:
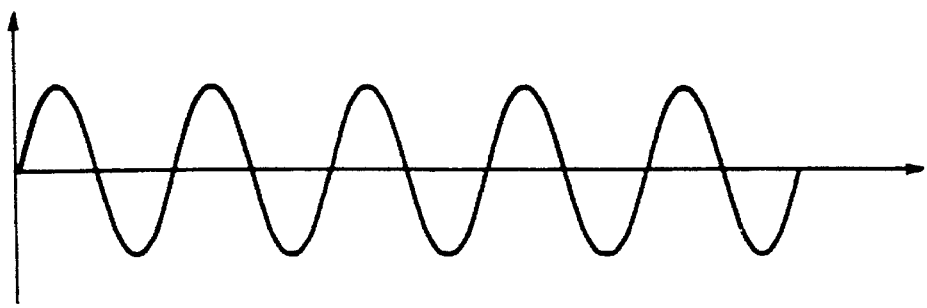

The theory behind the improvement in the resolution of the radar system at close range will now be described with reference to the waveforms shown in FIG. 9. While reference will be made to very low values of IF for the purpose of description, it will be understood that in practice somewhat higher frequencies will usually occur. Waveform A shows a graph of signal amplitude against time for a beat frequency signal corresponding to a part of the sweep of a frequency scanned radar system. A Fourier transform is applied to four time portions of the signal t1, t2, t3 and t4 to correspond to four beamwidths. A beat signal is present in all four of the time portions and in this graph they all have a frequency of 2 Hz and a relative phase of zero degrees. Waveform B, however shows a beat signal having a slightly higher frequency to which is applied a Fourier transform over the same four time portions of the signal. Because of the quantised nature of the transform, however, the frequency of the signal is still measured as 2 Hz although the signal at the end of each of the time portions t1, t2, t3 and t4 has a phase of 90 degrees, 180 degrees, 270 degrees and 360 degrees (0 degrees) relative to the start of the signal. The measured range of the obstacle responsible for the signal is thus in error by 20%. If the signal is analysed on the basis of all four of the time portions, the frequency in measured four times more accurately and, in this simplified example, is measured exactly.

In this embodiment of the present invention, the frequency scan must be continuous over at least the frequency span of the widest beam required to be processed. Since a wide beam including all of the individual beams was used in the example above, the frequency scan was continuous over its whole span.

The embodiment has been described as using the frequency scanned antenna for both transmission and reception but this need not be the case in practice. For example, the radar signal could be transmitted by a frequency scanned antenna and the reflected signal received by a single horn antenna. Alternatively, the radar signal could be transmitted by a single horn antenna and the reflected signal received by a frequency scanned antenna. Any difficulties with stray signal pick-up by the receiver antenna can be addressed in a number of different ways known to those skilled in the art.

For certain radar applications, particularly for use in an automotive intelligent cruise control (in other words a cruise control that takes into account the proximity of the vehicle ahead), the expense and complexity of a scanned beam antenna radar system may not be desired or required. However, a fixed beamwidth radar does not provide sufficient coverage of the road ahead for all the possible ranges of obstacles in its path. The radar must have a sufficiently narrow beamwidth to distinguish a distant vehicle in the same lane as the vehicle carrying the radar from closer vehicles in adjoining lanes and yet must not fail to detect a narrower obstacle, for example a motorcycle, close to the radar but not directly in front of it. A mechanical arrangement for altering the beamwidth of the radar is unlikely to be sufficiently fast, cheap or reliable for automotive applications.

Figure 10:
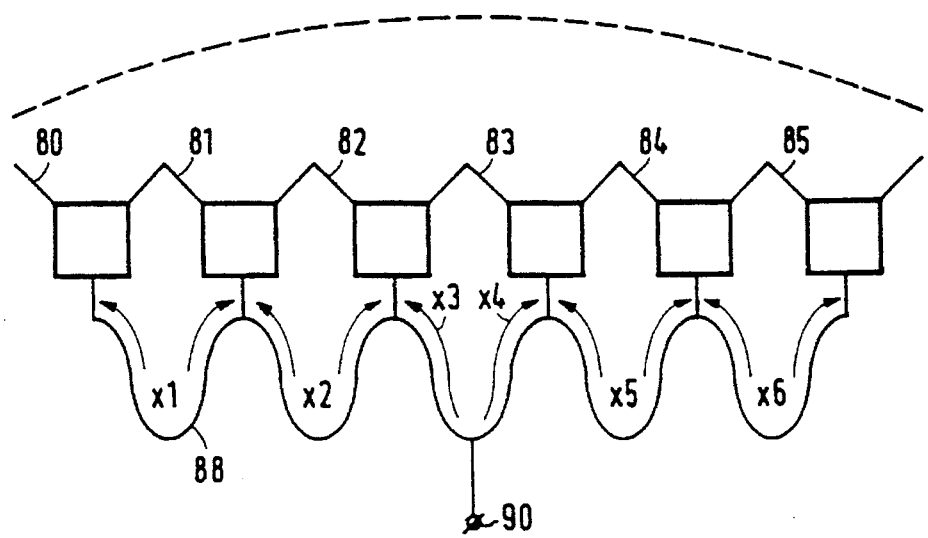
FIG. 10 shows a schematic diagram of a serpentine fed antenna array for use in a radar system.

FIG. 10 shows a schematic diagram of a serpentine fed antenna which, for simplicity of description has only 6 radiating elements 80 to 85. A practical realisation would have twenty or even thirty such elements to provide a sufficiently small beamwidth for distant obstacles. A serpentine feed central connection 90 is provided for coupling the antenna to a FMCW radar of the type described with reference to FIG. 1. Two opposed antenna arrays are fed from the connection 90, a first array comprised of elements 80 to 82 and a second array comprised of elements 83 to 85. The distances along the feed from the connection 90 to the elements 82 and 83 are x3 and x4 respectively. The element 81 is connected via a feed line of length x2 to the element 82 and the element 80 is connected via a feed line of length x1 to the element 81. The element 84 is connected via a feed line of length x5 to the element 83 and the element 85 is connected to the element 84 via a feed line of length x6. At a given frequency f the feed lines x1, x2, x5 and x6 are all an integral number of wavelengths long so that the wavefronts generated by the antenna array when fed with a signal at frequency f are all in phase. The beam generated by the antenna array will thus radiate directly ahead. However, the length of feedlines x2 and x5 (which are equal) is chosen to be greater than that of the feedlines x1 and x6 (which are also equal) by an integer number of wavelengths, for example 10 wavelengths at frequency f. Where further antenna elements are added, these will be fed from the elements at the ends of the array by feed lines having progressively larger, integral numbers of wavelengths at the frequency f. The lengths of the feed lines x3 and x4 are equal but may take a range of actual values commensurate with losses and the practicalities of antenna construction. The calculation of the feed line lengths in a practical antenna is described below.

In operation, as the frequency of the signal fed to the antenna array falls, the phase front produced by the elements 81 and 84 will lag behind that of elements 82 and 83 and the phase fronts produced by elements 80 and 85 will lag behind those produced by the elements 81 and 84. As a result of these lags, the phase front produced by the total antenna array will have a curved shape as indicated by broken lines on the drawing. As the frequency reduces still further, the phase fronts produced by the antenna elements distant from the connection 90 will lag those of elements 82, 83 still further and the beamwidth of the antenna array will broaden. An antenna having 30 elements can be arranged to provide a sufficiently narrow beamwidth to distinguish distant vehicles and a sufficiently wide beamwidth at close range to detect obstacles at the periphery of the carriageway with a frequency scan of the order of 500 MHz. Those obstacles detected by the broadened beam at too great a range can be rejected.

Figure 11:
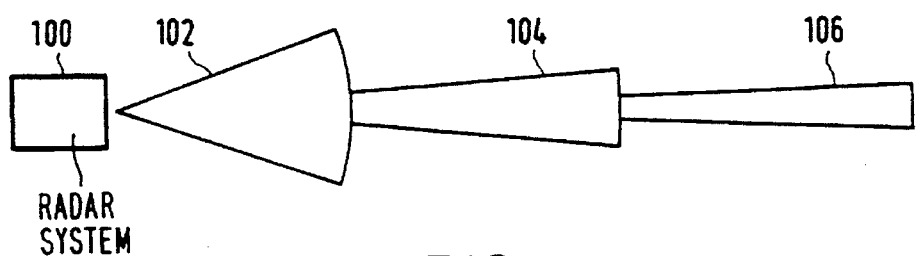
FIG. 11 shows a diagrammatic plan view of the radar beam produced by the arrangement of FIG. 10.

FIG. 11 shows a radar system 100 in accordance with the foregoing embodiment of the present invention together with three example beamwidth patterns 102, 104 and 106 for close, medium and long ranges respectively. In practice, the processing circuitry can be arranged to provide a continually narrowing beam with increases in range as opposed to the discrete ranges shown in the figure.

Figure 12:
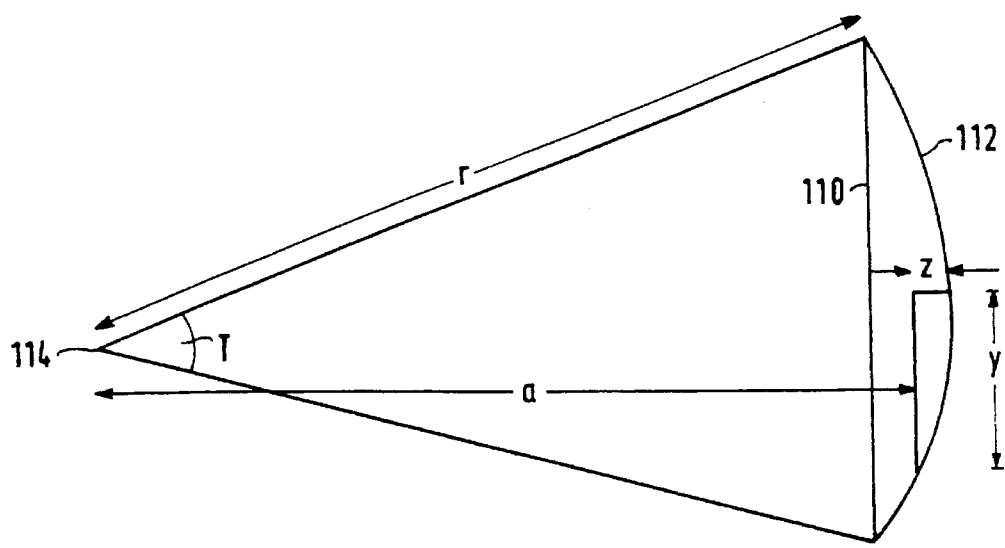
FIG. 12 shows a diagram used to explain the operation of the arrangement of FIG. 10.

The beamwidth of a radar in accordance with this embodiment may be calculated as follows with reference to FIG. 12. The face of the antenna array is represented by the line 110 and the curved wavefront of the transmitted signal by the line 112. This wavefront has a radius r which gives an imaginary source of the wavefront at 114. The distance between two elements in the array is shown as y and the lag of the phasefront between them is shown as z. The distance a is defined as (r–z). From Pythagoras' theorem:

$$z = r - \sqrt{r^2 - y^2}$$

Number of wavelengths lag=$z/\lambda$=$z\cdot f/v$ where v is the propagation velocity, in this case the speed of light c.

The phase of a signal at a point in a line is given by:

$$\phi = 2 \cdot PI \cdot x/\lambda = 2 \cdot PI \cdot x \cdot f/c$$

$$\Delta\phi = 2 \cdot PI \cdot x \cdot \Delta f/c$$

which gives $$x = \frac{\Delta\phi}{\Delta f} \cdot \frac{c}{2 \cdot PI}$$

and therefore $$\Delta\phi = 2 \cdot PI \cdot z/\lambda = 2 \cdot PI \cdot (r - \sqrt{r^2 - y^2}) \cdot f/c$$

and substituting, $$x = \frac{f}{2 \cdot PI \cdot \Delta f} \cdot 2 \cdot PI \cdot (r - \sqrt{r^2 - y^2})$$

giving $$x = \frac{f}{\Delta f} \cdot (r - \sqrt{r^2 - y^2})$$

This equation can be solved for the length x of the serpentine line required between the elements of the antenna. Usually the frequency deviation is fixed by oscillator and interference considerations and the radius of the wavefront by the application so the length of the serpentine line can be selected to satisfy the requirements.

From reading the present disclosure other modifications will be apparent to persons skilled in the art. Such modifications may involve other features which are already known in the design, manufacture and use of radar arrangements and component parts thereof and which may be used instead of or in addition to features already described herein. Although claims have been formulated in this application to particular combinations of features, it should be understood that the scope of the disclosure of the present application also includes any novel feature of any novel combination of features disclosed herein either explicitly or implicitly or any generalisation thereof, whether or not it relates to the same invention as presently claimed in any claim nd whether or not it mitigates any or all of the same technical problems as does the present invention. The applicants hereby give notice that new claims may be formulated to such features and/or combinations of such features during the prosecution of the present application or of any further application derived therefrom.

I claim:

1. A frequency modulated continuous wave radar system comprising an oscillator having a radar output signal arranged to provide ascending and descending frequency ramps, means for transmitting the radar output signal, means for receiving a reflected radar signal from obstacles and processing means responsive to the radar output signal and the reflected radar signal, characterised in that the processing means comprises means for deriving a first pseudorange for each obstacle reflecting a signal during the ascending frequency ramps, means for deriving a second pseudorange for each obstacle reflecting a signal during the descending frequency ramps, means for determining a first velocity estimate for each obstacle from a plurality of first pseudoranges, means for determining a second velocity estimate for each obstacle from a plurality of second pseudoranges, means for deriving a first range estimate for each obstacle in response to a first pseudorange and the first velocity estimate, means for deriving a second range estimate for each obstacle in response to a second pseudorange and the second velocity estimate for each obstacle, means for determining which first range estimate and which second range estimate correspond to the same obstacle.

2. A system as claimed in claim 1, further comprising means for determining the radial velocity of each obstacle from the difference between the first and second pseudoranges corresponding to that obstacle.

3. A system as claimed in claim 1 or claim 2, characterised in that at least one of the means for transmitting the radar output signal and the means for receiving a reflected radar signal includes a frequency scanned antenna array.

4. A system as claimed in claim 3, characterised in that the processing means further comprises means for analysing a plurality of portions of the beamwidth of the frequency scanned antenna array for deriving the range and bearing of obstacles in response to the reflected radar signal and the frequency of the oscillator radar output signal, the means for analysing a plurality of portions of the total beamwidth comprising means for analysing a first number of portions of the beamwidth and means for analysing a second, smaller, number of portions of the beamwidth.

5. An arrangement as claimed in claim 4, wherein the means for analysing a plurality of portions of the beamwidth further comprises means for analysing a third number of portions of the total beamwidth which third number is smaller than the second number.

6. A system as claimed in claim 3, characterised in that the scanned antenna array comprises a feed, a first array of antenna elements and a second array of antenna elements, the first array of antenna elements being arranged opposed to the second array of antenna elements, wherein the first and second arrays include a serpentine feed for coupling the elements which serpentine feed has different lengths between successive antenna elements.

7. A radar arrangement as claimed in claim 6, wherein the length of the serpentine feed between successive antenna elements is greater for those elements more distant from the feed.

8. A radar arrangement as claimed in claim 6 wherein the first and second pluralities of antenna elements are substantially symmetrical about the feed.

9. A radar arrangement as claimed in claim 7 wherein the first and second pluralities of antenna elements are substantially symmetrical about the feed.

* * * * *